Feb. 21, 1961     F. J. TUCCI     2,972,420
TOOL STAND
Filed Nov. 10, 1959

INVENTOR.
FRANK J. TUCCI
BY Nicholas J. Garofolo
his ATTORNEY

United States Patent Office 2,972,420
Patented Feb. 21, 1961

2,972,420

TOOL STAND

Frank J. Tucci, 32—20 47th St., Long Island City 3, N.Y.

Filed Nov. 10, 1959, Ser. No. 852,018

2 Claims. (Cl. 211—95)

This invention relates to a tool stand of an improved and practical nature which is designed to occupy a limited space and yet support in a practical manner a relatively large number of tools. The invention is particularly suited for supporting small sized tools; such as, hammers, pliers, screwdrivers, drills, saws, and others.

A feature of the invention is a holder rotatably supported in a stand and having a plurality of radially extending panels, each adapted to support a large number of tools. This feature makes the tools of the several panels accessible to the user by simply rotating the holder as required to bring a particular panel bearing the desired tool before the user. This feature enables the tool stand to occupy a corner or other usually unused portion of a room; it further enables a large number of tools to be orderly arranged and accessible to the user in a small area of a room.

Another feature of the invention is the knock-down structure of the tool stand whereby the several components thereof may be made available in kit form and readily assembled or disassembled.

A still further feature of the invention is the particular structure thereof whereby a practical yet inexpensive tool stand is made available for use in the small workshop wherein tool storage space is limited.

The invention further lies in the particular construction of its component parts and in their relative association with one another whereby the results and advantages intended herein are effected.

The foregoing as well as other features and advantages of this invention will appear more fully hereinafter from a consideration of the detailed description which follows, when taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is an elevational view of a tool stand embodying the invention;

Fig. 2 is an elevational view of the tool stand shown in Fig. 1 with some of the parts thereof omitted for convenience in illustrating, and showing the rotatable holder in the stand turned 90° from the position shown in Fig. 1;

Fig. 3 is a section on line 3—3 of Fig. 1;

Fig. 4 is an enlarged fragmentary plan detail of the intersecting panel units; and Fig. 5 is an enlarged sectional detail of the mode of association of the shaft with the wall bracket.

For a more detailed understanding of the invention reference is now directed to the several drawings wherein a tool stand embodying the invention is illustrated. It includes a supporting base 1 having level top and bottom faces 2 and 3. The base is adapted to be mounted to a level support 4 by means of suitable fasteners 5 passed at opportune points through appropriate holes in the base and anchored fast to the support. The latter may be a floor, table, bench, or other suitable surface. The base 1 is preferably formed of two thick layers 6 and 7 of sturdy board secured fast to each other, as by screws 8.

A vertically extending cylindrical shaft 9 which serves as an axis of rotation of a tool holder, generally indicated 11, is anchored fast at its lower end 12 centrally of the base 1, and is anchored fast at its upper end 13 to the outer end of a wall bracket 14. The shaft 9 is preferably a pipe threaded at its opposite ends 12 and 13.

The threaded end 12 extends with a slide fit through a hole 15 in the upper layer 6 of the base, and projects into a relatively larger hole 16 in the underlayer 7. The hole 16 defines a recess which opens through the bottom face 3 of the base. A nut 17 and a lock nut 18 threaded upon the lower end 12 of the shaft and tightened into abutment respectively with the lower and upper faces of the upper layer 6 of the base secure the shaft fast to the base in vertical position. A cap 19 is tightly threaded over the top end of the shaft. A bolt 21 having an enlarged head 22 abutting the upper surface of an arm 23 of the wall bracket 14 has a cylindrical shank 24 passing with an easy slide fit through a hole in the end area of the arm 23. The shank 24 is threaded tightly into a complementary hole centrally of the end wall 25 of the cap 19 so as to secure the arm 23 and the cap 19 fast to one another against relative rotation. A flange 26 offset from the opposite end of the arm 23 of the wall bracket is adapted to be mounted fast to a supporting wall 27 by means of a pair of screws 28. It is apparent that, before the bolt 21 is tightened and before the wall bracket is mounted to the supporting wall 27, the wall bracket is adjustably rotated about the shank of the bolt 21 as desired so as to position the flange 26 of the wall bracket properly against the supporting wall. After the latter adjustment has been made, the bolt 21 is tightened to prevent rotative movement of the tool stand relative to the wall bracket.

The holder 11 is mounted for rotation about the shaft 9. The holder is intended as a support for various small tools; such as, hammers, pliers, screwdrivers, and others. The holder comprises a pair of vertically elongated panel units 29 and 31 intersecting one another at right angles, and each bearing centrally upon the shaft 9 for rotation about the latter.

In further detail, the panel unit 29 comprises a pair of elongated broad flat faced panels 32 of rectangular form. These are aligned in lateral spaced relation, and have their faces 33 lying in the same plane. Each panel 32 has a thickness equal to the diameter of the shaft 9. They are held together in the spaced relation mentioned by means of two pairs of metal straps, one pair 34 extending transversely of opposed upper marginal face portions of the panels, and the other pair 35 similarly arranged at the lower ends of the panels. The straps in each pair are disposed in parallel opposed relation to each other, and the outer longitudinal edges 36 thereof are flush with the corresponding ends of the panels. A plurality of bolts 37 secure the straps fast to the panels. Each bolt 37 has a head 38 limited in one strap of a pair, a shank 39 passing through a panel, and a threaded portion 41 threadedly engaged in the other strap of the pair. In this manner the panels and straps may be readily assembled or disassembled.

The shaft 9 extends upwardly in the space 42 between the longitudinal inner sides 43 of the panels and in parallel relation to the latter. The shaft passes centrally between both pairs of straps, and has a bearing relation to the opposed inner faces 44 of each pair of straps, so that the panel unit 29 is rotatable relative to the shaft 9.

It is to be noted that the space 42 between the panels 32 is relatively wider than the diameter of the shaft 9, and that the latter is centered in this space clear of the inner sides of the panels. The panel unit 29 is restrained from radial movement relative to the shaft, and the latter is maintained centralized relative to the inner sides of the panels by dowel pins 45. Two of the latter are supported in spaced parallel relation between the upper pair of straps in such manner that one of them extends tangently in bearing contact with one area of the shaft, and the other extends similarly over the diametrically opposite area of the shaft. Another two of the pins are similarly arranged in the lower straps. By this arrangement the panel unit 29 bears, as it rotates about the shaft 9, upon the latter by means of the several dowel pins and by means of the inner faces of the several straps. The under edges 46 of the lower straps rest upon a bearing washer plate 40 disposed about the shaft between the panel unit and the lock nut 18.

The second panel unit 31 is in all respects similar to the panel unit 29 just described, except that the upper and lower pairs of straps 47 and 48 thereof are respectively located a little inwardly of the corresponding ends of the panels 49 and 50 thereof, as appears in Fig. 1. The panel unit 31 is disposed crosswise of and in intersecting relation to panel unit 29. It extends through the central space 42 of panel unit 29, and is centered relative to the shaft 9. This second panel unit bears upon the latter in the same manner as the panel unit 29 by means of the inner faces of the straps 47 and 48, and by means of the dowel pins 51. The under edges 52 of the straps 48 of the panel unit 31 rest upon the upper edges 53 of the corresponding straps of panel unit 29; and the upper edges 54 of the straps 47 of panel unit 31 underlie the under edges 55 of the straps 34 of panel unit 29. By this arrangement vertical play of one panel unit relative to the other is avoided.

It is to be noted from Fig. 1 that the outer faces 56 of the strap elements of the panel unit 31 are in abutment with the adjacent inner sides 43 of the panels of the panel unit 29. This is desired as it avoids lost motion or rotative play of one panel unit relative to the other. Further, by this arrangement, when manual rotational force is applied to one or the other of the panel units, both of the units will rotate as one about the shaft without wobble, play, or lost motion of one relative to the other.

A broad faced bearing washer 57 may be disposed about the shaft 9 and between the cap 19 and the panel units. This washer serves besides a bearing plate as a guard against the entrance of dirt between the several bearing elements at the upper ends of the panel units.

Each of the panels of the panel units serves as a wall support for various tools, particularly those of small size, as earlier mentioned. To this end the panels are preferably formed of wood, and each may be fitted with conventional tool supporting elements, of which there are many on the market for supporting small tools to a wall surface. These supporting elements may take the form of nails, hooks, straps, springs, clips, and others. A spring clip type of tool holder is shown in Figs. 1 and 4 at 58. While only a few tools are shown mounted to the holder 11 in Fig. 1; it is understood that such are for illustration only, and that a greater number may be accommodated upon the holder.

The base 1 of the tool stand is circular, and is of a diameter which is a little greater than the outer diameter of the holder 11. This enables the tool stand to be located in a corner of a room in close proximity to the walls thereof without interfering with rotation of the holder member 11 of the tool stand. In this manner space is utilized which would normally be wasted.

It can be further seen that as the holder is rotated, the various faces of the several panels are in turn brought before the user, whereby he may remove from the panels or replace thereon such tools as he may desire.

It is to be understood that if desired, the second panel unit 31 may be omitted from the holder.

The particular construction of the tool stand as described provides further benefits whereby the several components of the stand may be readily assembled together or disassembled. For example, the wall bracket 14 is removable by withdrawing the bolt 21; the panel units 29 and 31 are of a knock-down nature, the panels of each may be put together or taken apart by simply removing the bolts 37 and knocking out the dowel pins. This particular mode of construction enables the tool stand to be packed and sold in kit form for assembly by the purchaser.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is my intent, therefore to claim the invention not only as shown and described but also in all such forms as may fall within the spirit of the invention and the scope of the appended claims.

What is claimed is:

1. A tool stand comprising a support, a rotatable member mounted upon the support having a plurality of vertically elongated radial panels, and tool supporting means mounted upon the faces of the panels; wherein the support comprises a circular base, a vertical shaft mounted centrally to the base, and means supporting the rotatable member to the shaft for rotation; wherein the outer diameter of the rotatable member is less than that of the base; and the rotatable member comprises a pair of elongated panels extending radially in opposite directions relative to diametrically opposite areas of the shaft, each panel having a thickness equal to the diameter of the shaft, a pair of straps extending transversely of opposite marginal faces of the upper ends of the panels, a second pair of straps extending transversely of opposite marginal faces of the lower ends of the panels, means removably securing the several straps to the panels, and the several straps having inner face portions centrally thereof bearing upon the shaft.

2. A tool stand as defined in claim 1, wherein the shaft projects upwardly beyond the upper ends of the panels, and a wall bracket is fixed to the projecting end of the shaft.

References Cited in the file of this patent

UNITED STATES PATENTS

| 659,974 | Hussie | Oct. 16, 1900 |
| 716,116 | Scott | Dec. 16, 1902 |
| 890,886 | Woelz | June 16, 1908 |
| 1,242,305 | Arey | Oct. 19, 1917 |
| 1,801,453 | Patterson | Apr. 21, 1931 |
| 2,816,666 | Nadel | Dec. 17, 1957 |

FOREIGN PATENTS

| 19,811 | Norway | of 1909 |